United States Patent [19]

Lin

[11] Patent Number: 5,960,132
[45] Date of Patent: Sep. 28, 1999

[54] FIBER-OPTIC FREE-SPACE MICROMACHINED MATRIX SWITCHES

[75] Inventor: Lih-Yuan Lin, Middletown, N.J.

[73] Assignee: AT&T Corp., New York, N.Y.

[21] Appl. No.: 09/001,676

[22] Filed: Dec. 31, 1997

Related U.S. Application Data

[60] Provisional application No. 60/058,222, Sep. 9, 1997.

[51] Int. Cl.$^6$ ..................................................... G02B 6/26
[52] U.S. Cl. ............................................................. 385/18
[58] Field of Search ................................ 385/15–23, 147

[56] References Cited

U.S. PATENT DOCUMENTS

| | | | |
|---|---|---|---|
| 4,589,726 | 5/1986 | Buhrer ........................................ | 385/21 |
| 5,333,117 | 7/1994 | Ha et al. .................................. | 708/493 |
| 5,715,337 | 2/1998 | Spitzer et al. .............................. | 385/4 |

OTHER PUBLICATIONS

Horoshi Toshiyoshi and Hiroyuki Fujita, "Electrostatic Micro Torsion Mirros for an Optical Switch Matrix", Journal of Microelectromechanical Systems, vol. 5, No. 4, Dec. 1996, pp. 231–237.

P. Langlet, D. Collard, T. Akiyama and H. Fujita, "A Quantitative Analysis of Scratch Drive Actuation for Integrated X/Y Motion System", Transducers '97, 1997 International Conference on Solid–State Sensors and Actuators, Chicago, Jun. 16–19, 1997, pp. 773–776.

Terunobu Akiyama and Katsufusa Shono, "Controlled Stepwise Motion in Polysilicon Microstructures", Journal of Microelectromechanical Systems, vol. 2, No. 3, Sep. 1993, pp. 106–110.

K.S.J. Pister, M.W. Judy, S.R. Burgett and R.S. Fearing, "Microfabricated Hinges", Sensors and Actuators, A. 33, 1992, pp. 249–256.

William C. Tang, Tu–Cuong H. Nguyen, and Roger T. Howe, "Laterally Driven Polysilicon Resonant Microstructures", University of California at Berkley Department of Electrical Engineering and Computer Sciences and the Electronics Research Laboratory, Berkeley Sensor & Actuator Center, 1989, pp. 53–59.

*Primary Examiner*—Akm E. Ullah

[57] ABSTRACT

An optical switch device redirects a beam of light traveling along a first direction to a second direction and includes a base member, a reflective panel and an actuator. The reflective panel is pivotally connected to the base member and moves between a reflective state and a non-reflective state. In the reflective state, the reflective panel is disposed to redirect the beam of light from the first direction to the second direction. In the non-reflective state, the reflective panel is disposed to permit the light beam to travel along the first direction. The actuator is connected to the base member and the reflective panel and is operative to cause the reflective panel to move to and between the reflective state and the non-reflective state. An array of optical switch devices can be arranged to form a free-space optical matrix crossconnect apparatus.

21 Claims, 11 Drawing Sheets

FIBER-OPTIC FREE-SPACE MICROMACHINED MATRIX SWITCHES

This non-provisional application claims the benefit of U.S. Provisional Application No. 60/058,222, filed on Sep. 9, 1997.

BACKGROUND OF THE INVENTION

1. Field of Invention

The present invention relates to an optical switch device that redirects a beam of light traveling in free-space along a first direction to a second direction. Further, the present invention is directed to a plurality of optical switch devices that form a free-space optical matrix crossconnect apparatus.

2. Description of Related Art

Modern communications companies now use fiber optic cables as the primary carrier for voice and data signals transmitted as light beams for ground-based communications networks. Similar to communication networks using copper wire as the carrier for electronic signals, fiber optic cable trunk lines are interconnected to each other through switching nodes positioned at various locations throughout the service area of the communications network. Telephone calls, for example, are routed through nodes A, B and C. Occasionally, a communications failure may take place between nodes B and C. To restore communications, the signals which can no longer be routed through node C must be routed through an alternative node D. To achieve rerouting of the communications signals, a conventional free-space micromachined optical matrix switch is used. Also, conventional free-space micromachined optical matrix switches are used for signal routing passes for providing light signals to various locations.

One type of a conventional micromachined free-space optical matrix switch 2 is introduced in FIGS. 1–4. The conventional optical matrix switch 2 uses electrostatically actuated torsion mirrors 4. The optical matrix switch 2 includes a first base member 6 and a second base member 8. The first base member 6 has an array of bores 10 formed therethrough and arranged in a plurality of columns and rows.

As best shown in FIG. 3, the torsion mirror 4 has a reflective panel member 12 and a torsion bar 14 connected to the reflective panel member 12 by a connector section 16. One of ordinary skill in the art would appreciate that the reflective panel member 12, the torsion bar 14 and the connecting section 16 are formed as a unitary construction.

Each of the bores 10 is sized to receive a respective one of the torsion mirrors 4. Each of the torsion mirrors is mounted onto the first base member by embedding opposite distal ends 18 and 20 of the torsion bar 14 into the first base member 6 so that each of the torsion mirrors can pivot between a reflective state and a non-reflective state as explained in more detail below.

The second base member 8 includes an array of cavities 22 as best shown in FIG. 1. The first base member 6 and the second base member 8 are connected to each other with the cavities 22 disposed in a manner to receive an end portion of the reflective panel member 12 when the reflective panel member 12 is in the reflective state as shown by the torsion mirror 4 drawn in phantom in FIG. 4. A support wall 24 retains the reflective panel member 12 at an appropriate position for redirecting a beam of light $L_1$ and $L_2$ traveling in a first direction to a second direction.

As best shown by FIG. 1, the bores 10 and the associated torsion mirrors 4 are arranged in columns and rows labeled C1 and C2 and R1 and R2 respectively. Each of the bores 10 are sized to receive a respective one of the torsion mirrors 4. Electrical leads 28a–d provide electrical power to the respective ones of the torsion mirrors 4 at the torsion bar 14. In the non-reflective state, the reflective panel member 12 of the torsion mirror 4 is substantially disposed in a plane formed by a first base surface 30 of the first base member 6. The reflective panel members 12 located in R1, C1 and R2, C2 are shown in the non-reflective state whereby the light beams $L_1$ and $L_2$ pass underneath the torsion mirrors 4 as best shown by FIGS. 1, 2 and 4. In the reflective state, the reflective panel member 12 drawn phantomly in FIG. 4 is illustrated with an end portion of the reflective panel member 12 contacting the support wall 24. Also, the reflective panel members are positioned within the bores so that, for example, the light beams $L_1$ and $L_2$ being projected from the fiber optic cables 26a and b positioned in rows R1 and R2 are deflected by the reflective panel members located in R1, C2 and R2, C1 respectively so that the light beams $L_1$ and $L_2$ can be redirected to the fiber optic cables 26C and D located in C1 and C2 respectively. In brief, because each of the light beams in this example is redirected 90 degrees, a longitudinal axis "1" of the reflective panel member 12, as shown in FIGS. 2 and 3, must be oriented at a 45 degree angle a relative to the incoming and outgoing light beams $L_1$ and $L_2$ as best shown in FIG. 2.

For a more detailed explanation of the conventional optical matrix switch 2 described above, reference is made to Journal of Microelectromechanical Systems, Vol. 5, No. 4, December 1996 in an article entitled "Electrostatic Micro Torsion Mirrors for an Optical Switch Matrix" by Hiroshi Toshiyoshi and Hiroyuki Fujita. For additional details regarding conventional optical matrix crossconnects, reference is made to a book entitled "An Introduction to Photonic Switching Fabrics" by H. Scott Hinton, published in 1993 by Plenum Press in New York.

One problem with such an optical matrix switch described above is that a voltage must be continuously applied to retain the reflective panel mirror in the reflective state. Often, in practice, the torsion mirror may not be used for years before it is activated. Thereafter, it may continue to be used in the opposite state for another period of years. Thus, electrical power is being consumed while the torsion mirror is being retained in the reflective state. Also, another problem associated with the conventional optical matrix switch 2 is that precision alignment is required to connect the first base member and the second base member together so that the support wall 24 is properly oriented to retain the reflective panel member properly in its reflective state.

Additionally, electrostatic torque causes the reflective panel member to move between the reflective state and the non-reflective state. Electrostatic torque is a complicated area of the art and there is limited data to determine when mechanical fatigue might be expected over the lifetime of the conventional optical matrix switch. Also, switching from the non-reflective state to the reflective state requires approximately 300 milliseconds.

SUMMARY OF THE INVENTION

An optical switch device of the present invention is operative to redirect the beam of light traveling in free-space along a first direction to a second direction that is different from the first direction. The optical switch device includes a base member, a reflective panel and an actuator. The reflective panel is pivotally connected to the base member and is unbiasedly movable between a reflective state and a non-reflective state. In the reflective state, the reflective panel is disposed in a manner to redirect the beam of light from the first direction to the second direction. In the non-reflective state, the reflective panel is disposed away from the beam of light to permit the beam of light to travel along the first direction. The actuator is connected to the base member and the reflective panel and causes the reflective panel to move to and between the reflective state and the non-reflective state.

The reflective panel includes at least one hinge pin member and at least two hinge pin connecting members. The two hinge pin connecting members are disposed apart from one another and are connected to an edge portion of the reflective panel. The at least two hinge pin connecting members project outwardly from the edge portion of the reflective panel so that the at least one hinge pin can be mounted to and secured between the at least two hinge pin connecting members. A staple element having a channel sized to receive the at least one hinge pin member is connected to the base member with the at least one hinge pin member disposed within the channel so that the reflective panel can pivotally move about a pivot axis that extends through the at least one hinge pin member. Although the staple element and the at least one hinge pin member are disposed in close proximity to each other, the size of the channel of the staple element permits the reflective panel to freely pivot about the pivot axis without interference from the staple element.

The actuator includes a hinge assembly and a translation plate. The hinge assembly has at least one connecting rod with a first end pivotally connected to the reflective panel and an opposite second end pivotally connected to the translation plate. The translation plate is slidably connected to the base member and moves between a first position and a second position. When the translation plate is in the first; position, the reflective panel is in the reflective state. When the translation plate is in the second position, the reflective panel is in the non-reflective state.

Preferably, the actuator is a scratch drive actuator mechanism or a comb drive mechanism. At least one of these mechanisms is connected to the translation plate and is operative in conjunction with the base member to cause the translation plate to move to and between the first and second positions.

Additionally, a spring element could also be used as an actuator component. The spring element is connected to and between the base member and the translation plate. While either the scratch drive actuator mechanism or the comb drive mechanism moves the translation plate to one of the first and second positions, the spring element is operative to cause the translation plate to move to the remaining one of the first and second positions. An alternative actuator includes a translation plate having at least a first channel and a second channel. A first driving pin is sized for slidable engagement with the first channel and a second driving pin is sized for slidable engagement with the second channel. The first driving pin slidably engages the first channel with the second driving pin retracts from the second channel so that the translation plate moves to the first position with the second driving pin being positioned offset relative to the second channel. Correspondingly, the second driving pin slidably engages the second channel while the first driving pin retracts from the first channel so that the translation plate moves to the second position with the first driving pin being positioned offset relative to the first channel.

Another embodiment of the present invention is a free-space optical matrix crossconnect apparatus that includes a base member, an array of optical switch devices and a plurality of fiber optic cables. The array of optical switch devices are operatively connected to the base member and are arranged in a plurality of columns and rows. Each fiber optic cable is disposed along a periphery of the base member at a respective one of the columns and rows and is capable of emitting and receiving a light beam.

The optical switch device of the present invention is used in optical communications networks in order to redirect a beam of light from an original destination node to an alternate destination node. A plurality of optical switch devices are arranged in an array to form a free-space optical matrix crossconnect apparatus. The optical matrix crossconnect apparatus permits a plurality of light beams to be redirected from respective ones of the original destination nodes to a plurality of alternate destination nodes.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
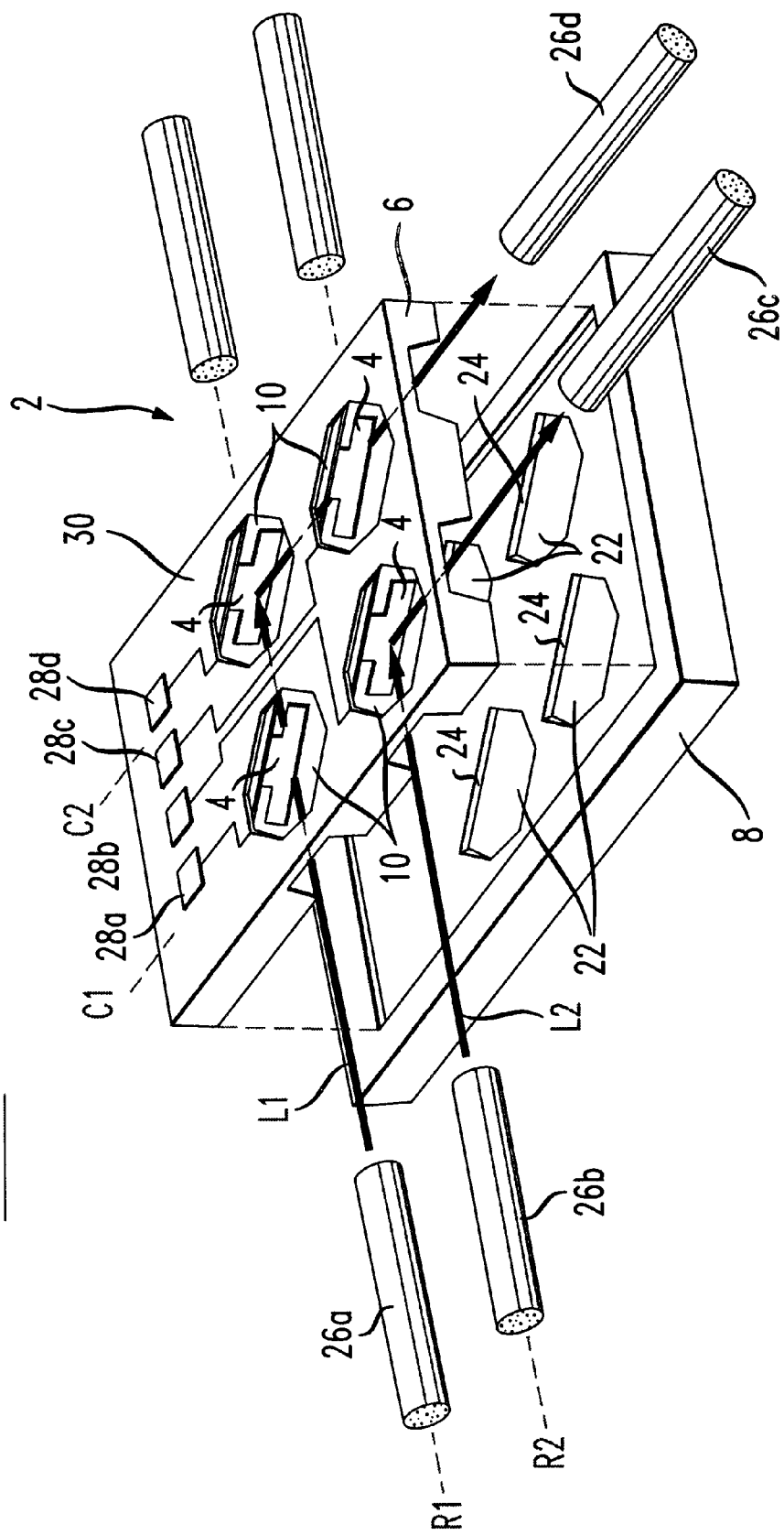
FIG. 1 is a partially exploded perspective view of a conventional optical matrix switch that uses electrostatically-operated torsion mirrors.
Figure 2:
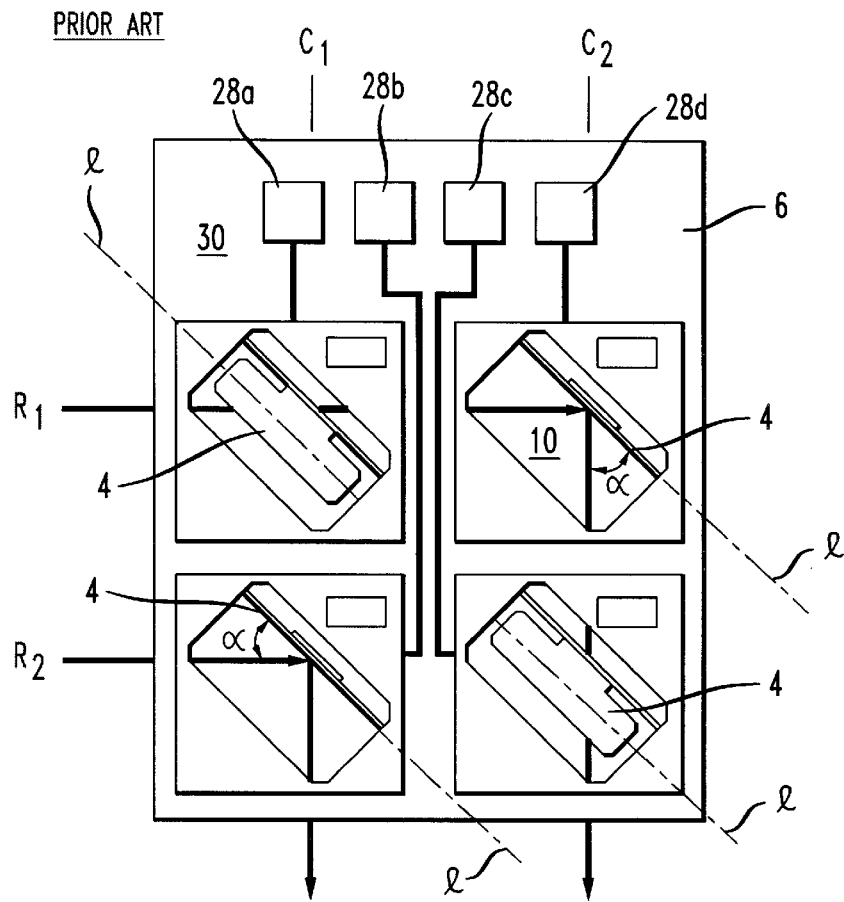
FIG. 2 is a top view of the conventional optical matrix switch shown in FIG. 1.
Figure 3:
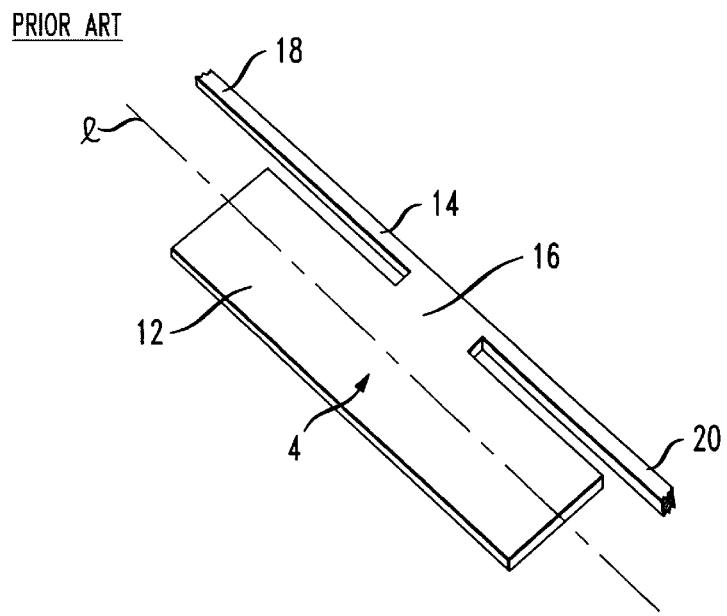
FIG. 3 is a perspective view of the electrostatically-operated torsion mirror used in the conventional optical matrix switch in FIGS. 1 and 2.
Figure 4:
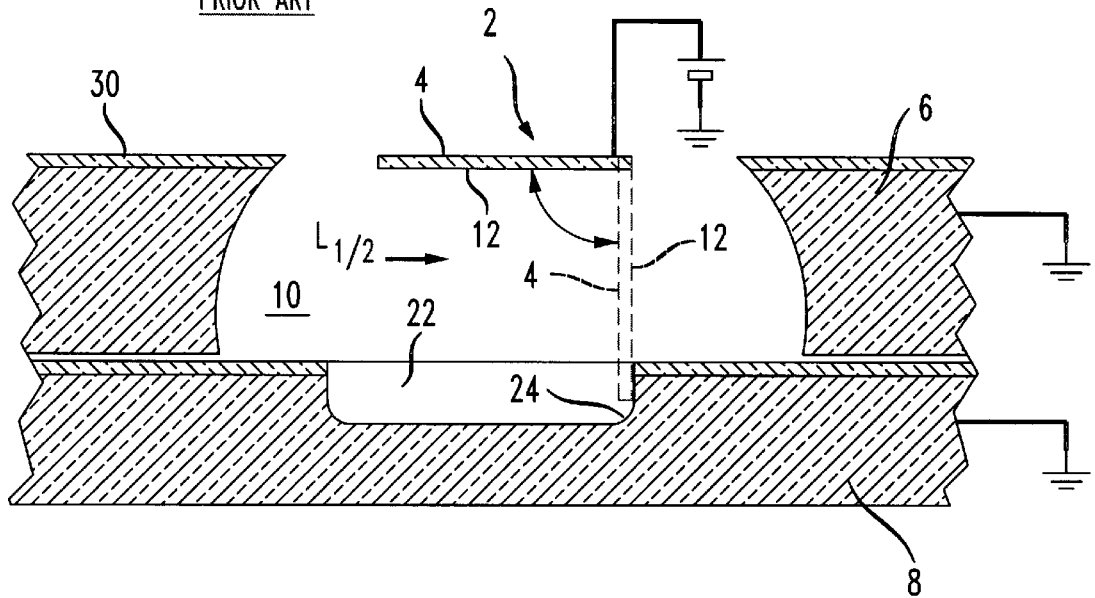
FIG. 4 is a side view of the electrostatically-operated torsion mirror shown in a non-reflective state and drawn phantomly in the reflective state.
Figure 5:
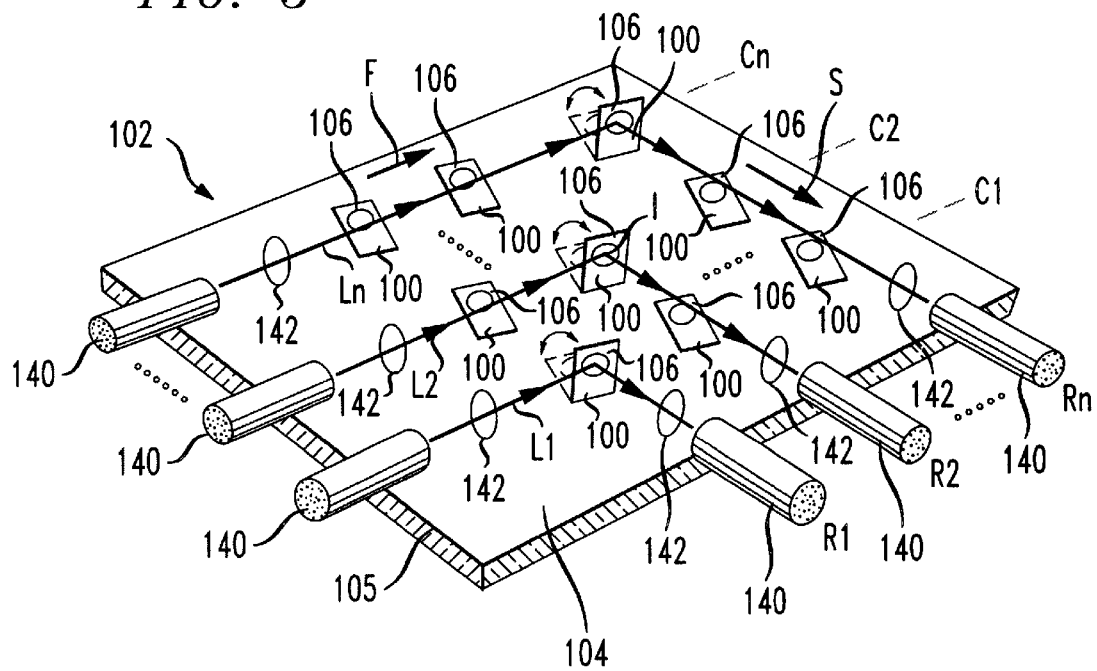
FIG. 5 is a perspective view of an optical matrix cross-connect apparatus of the present invention using a plurality of optical switch devices of the present invention.

A first embodiment of an optical switch device 100 is generally introduced in FIGS. 5–9. A plurality of optical switch devices 100 forms a free-space optical matrix cross-connect apparatus 102 which is discussed in greater detail below. As best shown in FIG. 5, the optical switch device 100 is used for redirecting beams of light $L_1$–$L_n$ that are traveling in free-space through the optical matrix crossconnect apparatus 102 along a first direction indicated by arrow F to a second direction indicated by arrow S. As illustrated in FIG. 5, the first direction F is different from the second direction S.

Figure 6:
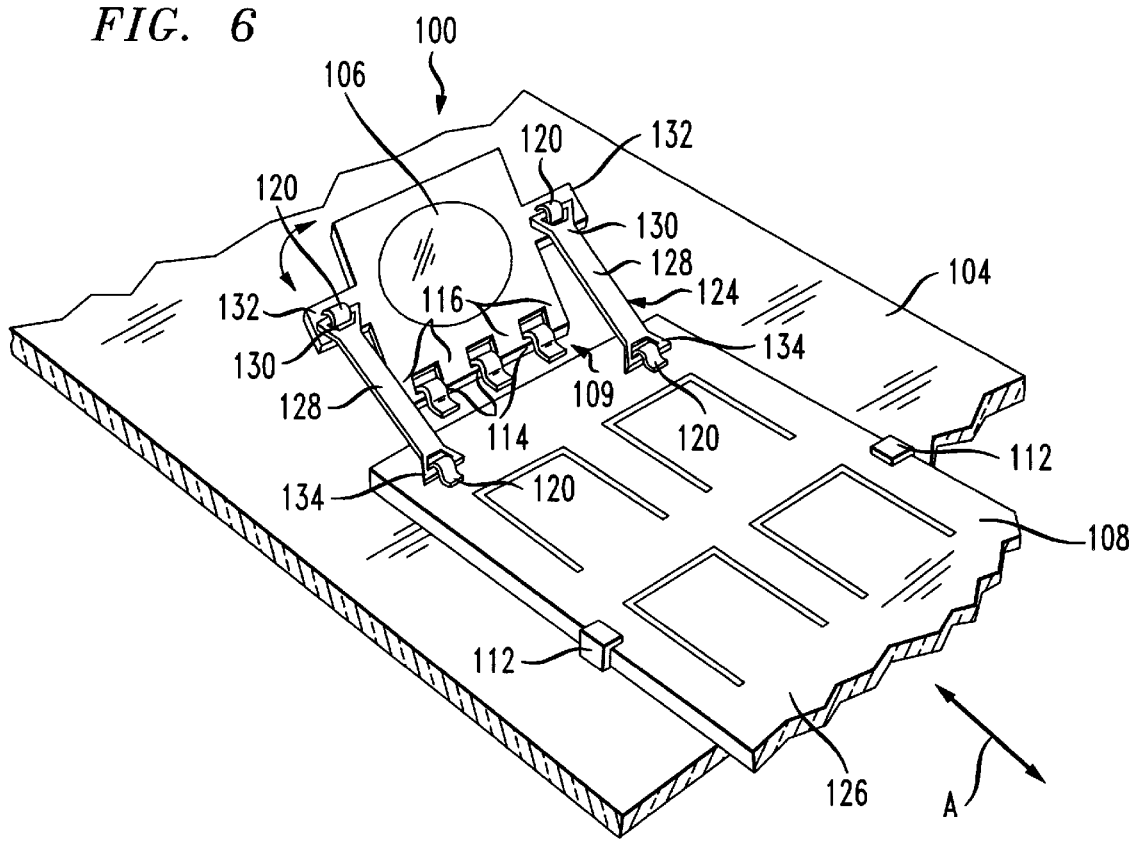
FIG. 6 is a perspective view partially broken away of the optical switch device of the present invention.

In FIG. 6, the first embodiment of the optical switch device 100 of the present invention includes a base member 104, a reflective panel 106 and an actuator 108. The base member 104, the reflective panel 106 and the actuator 106 are fabricated from a stiff yet resilient material such as silicon-based materials which are commonly used for micromachining operations.

The reflective panel 106 is pivotally connected to the base member 104 by a hinging structure 109 that is discussed in more detail below. In general, the hinging structure 109 enables the reflective panel 106 to move unbiasedly between a reflective state and a non-reflective state. With reference to FIG. 5, when the optical switch device 100 is in the reflective state, the reflective panel 106 is interposed in a path of a light beam, for example, $L_1$ traveling in free-space along direction F to the second direction S. Again, with reference to FIG. 5, when the reflective panel 106 is in a non-reflective state, the reflective panel 106 is disposed away from the optical path of the beam of light. In this instance, the beams of light pass over the reflective panels 106 that lay in an imaginary plane substantially parallel or coincident with the base member 104.

In FIG. 6, the actuator 108 is connected to the base member 104 and to the reflective panel 106. When energized, the actuator 108 is operative to cause the reflective panel to move to and between the reflective state and the non-reflective state. By way of example only, the actuator 108 illustrated in FIG. 6 is a conventional scratch drive actuator mechanism. For additional information regarding scratch drive actuator mechanisms, refer to Transducers '97, 1997 International Conference on Solid-State Sensors and Actuators, Chicago, Jun. 16–19, 1997 in an article entitled "A Quantitative Analysis of Scratch Drive Actuation for Integrated X/Y Motion System" by P. Langlet et al., pp. 773–776. The actuator 108 moves linearly as shown by arrow A in an actuation channel 110 formed in the base member 104. Retainers 112 retains the actuator 108 within the actuation channel 110 while enabling the actuator 108 to move rectilinearly which, in turn, moves the reflective panel 106 between the reflective slate and the non-reflective state.

Figure 7:
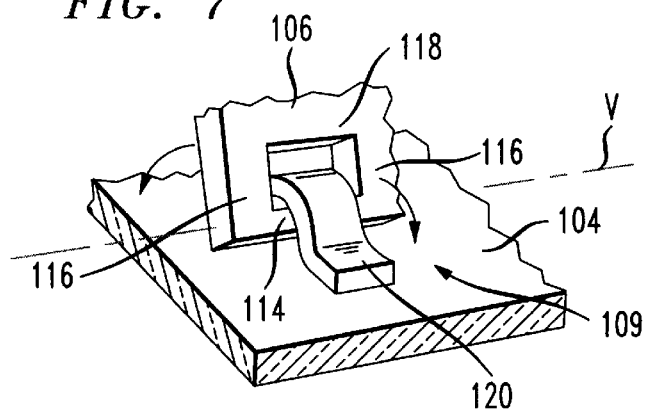
FIG. 7 is an enlarged perspective view partially broken away of a reflective panel of the optical switch device of the present invention illustrating a staple element connecting a reflective panel to a base member.

As best shown in FIG. 7, the reflective panel 106 includes a hinge pin member 114 and two hinge pin connecting members 116 that are disposed apart from one another and are connected to an edge portion 118 of the reflective panel 106. One of ordinary skill in the art would appreciate that the hinge pin member 114, the hinge pin connecting members 116 and the reflective panel 106 are formed as a unitary construction. FIG. 7 shows that the reflective panel 106 includes one hinge pin member 114 and two hinge pin connecting members 116. Although not by way of limitation, the reflective panel 106 shown in FIG. 6 illustrates, by way of example only, three hinge pin members 114 with four hinge pin connecting members 116.

Figure 8:
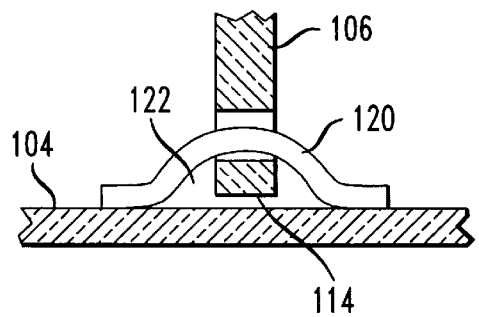
FIG. 8 is a side view partially in cross section of the staple element and reflective panel shown in FIG. 7.

The hinge pin connecting members 116 project outwardly from the edge portion 118 of the reflective panel 106 so that the hinge pin member 114 can be mounted therebetween. In FIGS. 7 and 8, a staple element 120 is connected to the base member 104 in a manner commonly known in micromachining techniques. The staple element 120 forms a channel 122 which is sized to receive the hinge pin member 114. When the reflective panel 106 is hinged to the base member 104, the hinge pin member 114 is disposed within the channel 122 to provide pivotal movement of the reflective panel 106 about a pivot axis "V" that extends through the hinge pin member 114. As best shown in FIG. 8, the hinge pin member 114 is disposed in close proximity with the staple element 120. However, even though the hinge pin member 114 and the staple element 120 are disposed in close proximity to each other, the reflective panel 106 is permitted to freely pivot about the pivot axis "V" without interference from the staple element 120.

Figure 9:
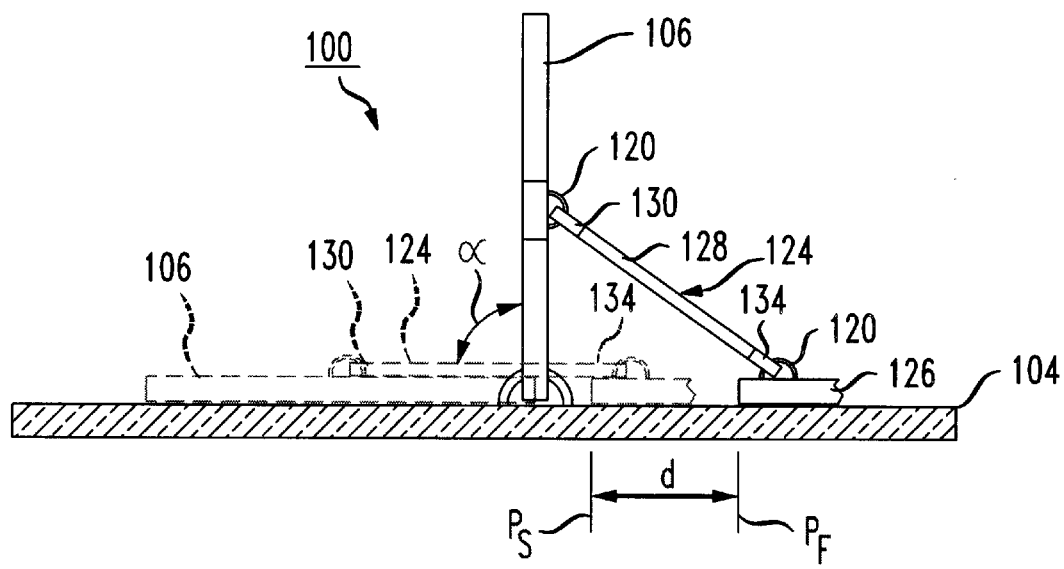
FIG. 9 is a side view of the reflective panel in a reflective state and a non-reflective state and a translation plate in a first position and a second position that corresponds with the reflective state and non-reflective state of the reflective panel.

With reference to FIGS. 6 and 9, the actuator 108 includes a hinge assembly 124 and a translation plate 126. The hinge assembly 124 has a pair of connecting rods 128. A first end 130 of each of the connecting rods 128 is pivotally connected to the reflective panel 106. As shown in FIG. 6, the reflective panel 106 includes arm members 132 that extend outwardly from respective lateral sides of the reflective panel 106. The first end 130 of each of the connecting rods 128 includes a hinging channel that receives the staple member 120 to hingably connect the first ends 130 of each of the connecting rods 128 to the arm members 132 of the reflective panel 106 in a manner similar to the hinging method described above. Each of the connecting rods 128 also includes a second end 134 which is disposed opposite of the respective first end 132 and is pivotally connected to the translation plate 126 also in a manner similarly described above.

With the translation plate 126 slidably connected to the base member 104, the translation plate 126 is capable of moving rectilinearly between a first position $P_F$ and a second position $P_S$. In FIG. 9, the translation plate 126 is shown in the first position $P_F$ which results in the reflective panel 106 being disposed in the reflective state. Drawn in phantom in FIG. 9, the translation plate 126 is moved into the second position $P_S$ resulting in the reflective panel 106 being disposed in the non-reflective state. A skilled artisan would appreciate that the reflective panel rotates at a rotation angle "α" between 0 degrees and 90 degrees. At 0 degrees, the reflective panel 106 is in the non-reflective state and, at 90 degrees, the reflective panel 106 is in the reflective state.

Figure 10:
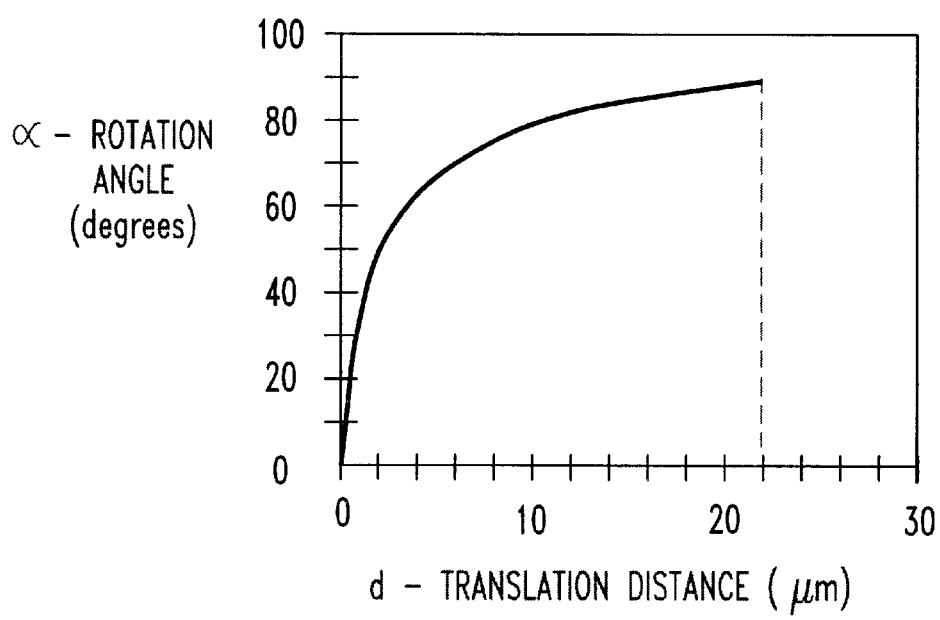
FIG. 10 is a graph illustrating rotation angle of the reflective panel relative to a translation distance of the translation plate.

As shown in FIG. 9, the translation plate 126 moves a translation distance "d" between the first position $P_F$ and the second position $P_F$. As shown in FIG. 10, approximately 22 microns, i.e., from the second position $P_S$ to the first position $P_F$, is the translation distance "d" required to rotate the reflective panel 90 degrees, i.e., from the non-reflective state to the reflective state.

Figure 11:
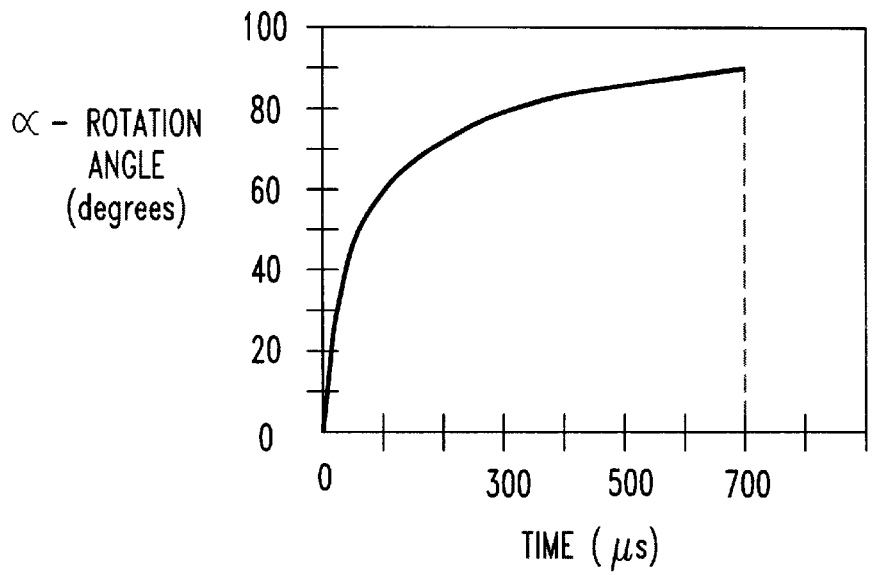
FIG. 11 is a graph illustrating rotation angle of the reflective panel as a function of time wherein the reflective panel moves from the non-reflective state to the reflective state.

FIG. 11 illustrates an amount of time required for the reflective panel 106 to move from the non-reflective state and the reflective state. The graph in FIG. 11 illustrates that 700 μs (microseconds) are required to move the reflective panel 106 from the non-reflective state to the reflective state, i.e., 0 degrees to 90 degrees. Based upon electrostatically-operated torsion mirrors, this is an improvement of approximately four hundred fold in response time.

Figure 12:
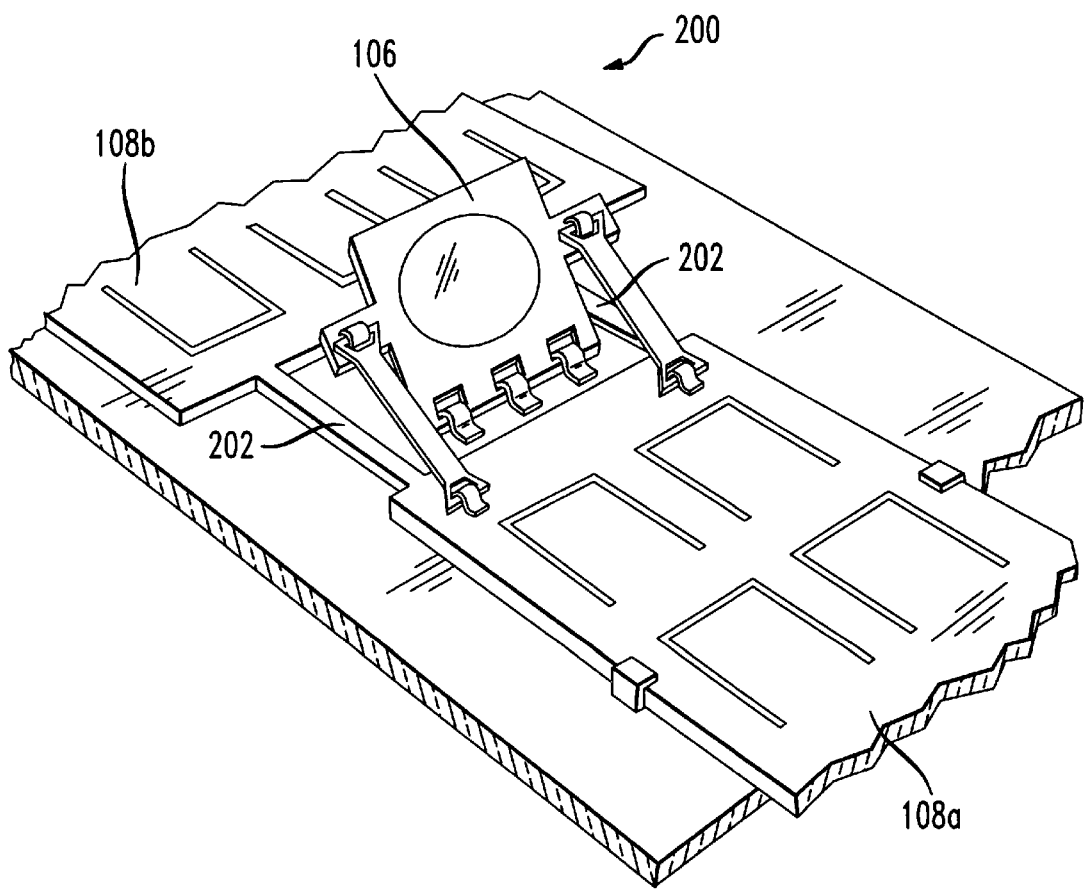
FIG. 12 is a perspective view of a second exemplary embodiment of the optical switch device of the present invention using two opposing scratch drive actuator mechanisms.

A second exemplary embodiment of an optical switch device 200 is illustrated in FIG. 12. The second exemplary embodiment of the optical switch device 200 is substantially similar to the first embodiment described above. However, the second embodiment of the optical switch device 200 includes a first scratch drive actuator mechanism 108a and a second scratch drive actuator mechanism 108b. The first scratch drive actuator mechanism 108a causes the reflective panel 106 to move from the non-reflective state to the reflective state. The second scratch drive actuator mechanism 108b is connected to the first scratch drive actuator mechanism 108a by connectors 202. After the reflective panel 106 is moved to the reflective state, the second scratch drive actuator mechanism 108b is used to pull the first scratch drive actuator mechanism 108a in a direction which would cause the reflective panel 106 to move to the non-reflective state.

The second exemplary embodiment of the optical switch device 200 of the present invention requires power only when the first and second scratch drive actuator mechanisms are moving the reflective panel. Thus, once the reflective panel 106 is in either the reflective state or the non-reflective state, no power is required to retain the reflective panel in that particular state. Furthermore, scratch drive actuators can be controlled to quickly and accurately move the reflective panel to 90°, i.e. in the reflective state. The prior art torsion mirror optical switching device requires an accurately placed support wall.

Figure 13:
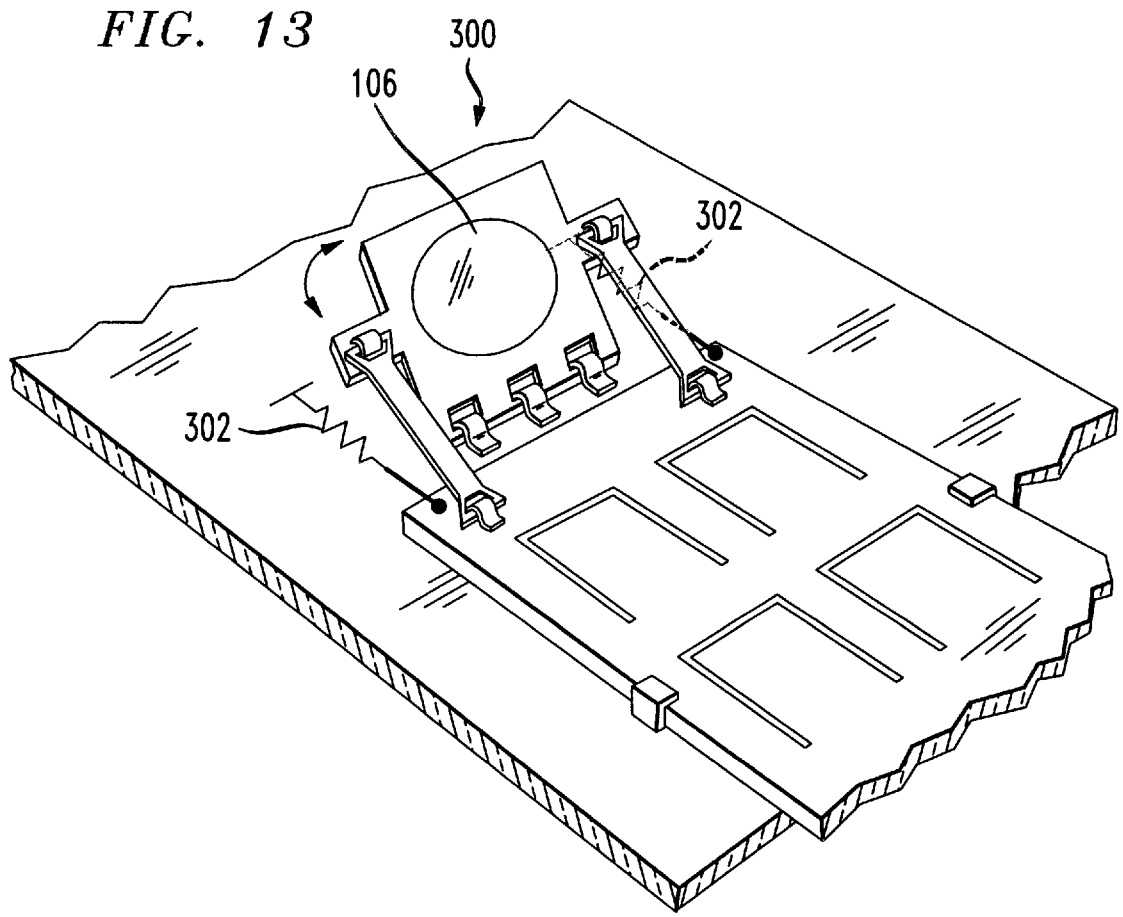
FIG. 13 is a third exemplary embodiment of the optical switch device of the present invention using a scratch drive actuator mechanism and spring elements.

A third exemplary embodiment of an optical switch device 300 of the present invention is illustrated in FIG. 13. Again, the third exemplary embodiment of the optical switch device 300 is substantially similar to the first and second exemplary embodiments of the optical switch devices described above. For the third exemplary embodiment of the optical switch device 300 of the present invention, the actuator includes the scratch drive actuator mechanism as described in the first exemplary embodiment of the optical switch device. Also, the actuator includes spring elements 302. The spring elements 302 are connected to the scratch drive actuator mechanism so that when the scratch drive actuator mechanism moves the reflective panel 106 to the reflective state, the spring elements 302 induce a spring bias against the scratch drive actuator mechanism to return it to its original position. In other words, the scratch drive actuator mechanism is used to move the reflective panel 106 from the non-reflective state to the reflective state while the spring elements 302 are used to move the reflective panel 106 from the reflective state to the non-reflective state.

Figure 14:
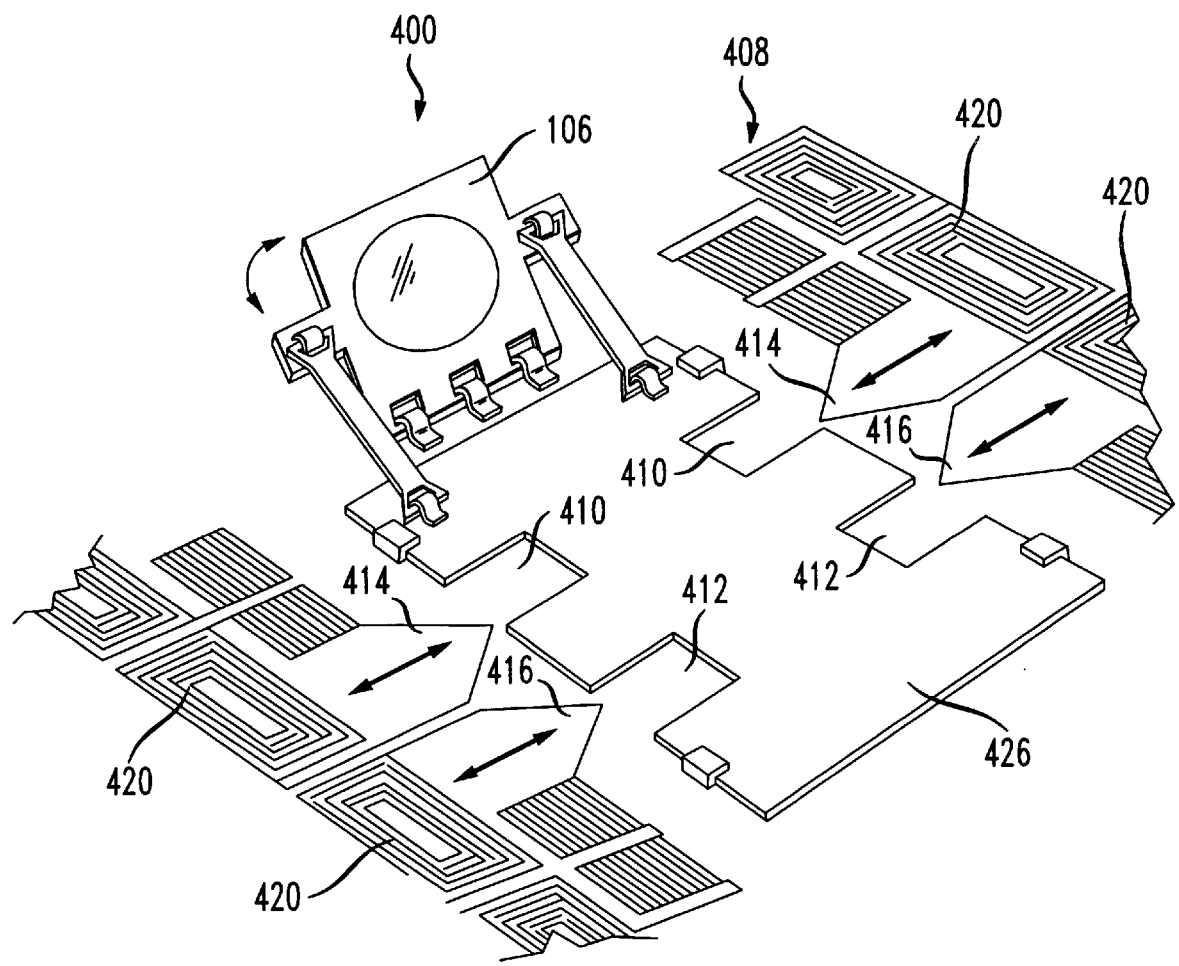
FIG. 14 is a fourth exemplary embodiment of the optical switch device using a channeled translation plate in conjunction with corresponding driving pins driven by scratch drive actuator mechanisms.

A fourth exemplary embodiment of the optical switch device 400 is illustrated in FIG. 14. Except for the actuator, the fourth exemplary embodiment of the optical switch device 400 of the present invention is substantially similar to the exemplary embodiments described above.

Figure 15A:
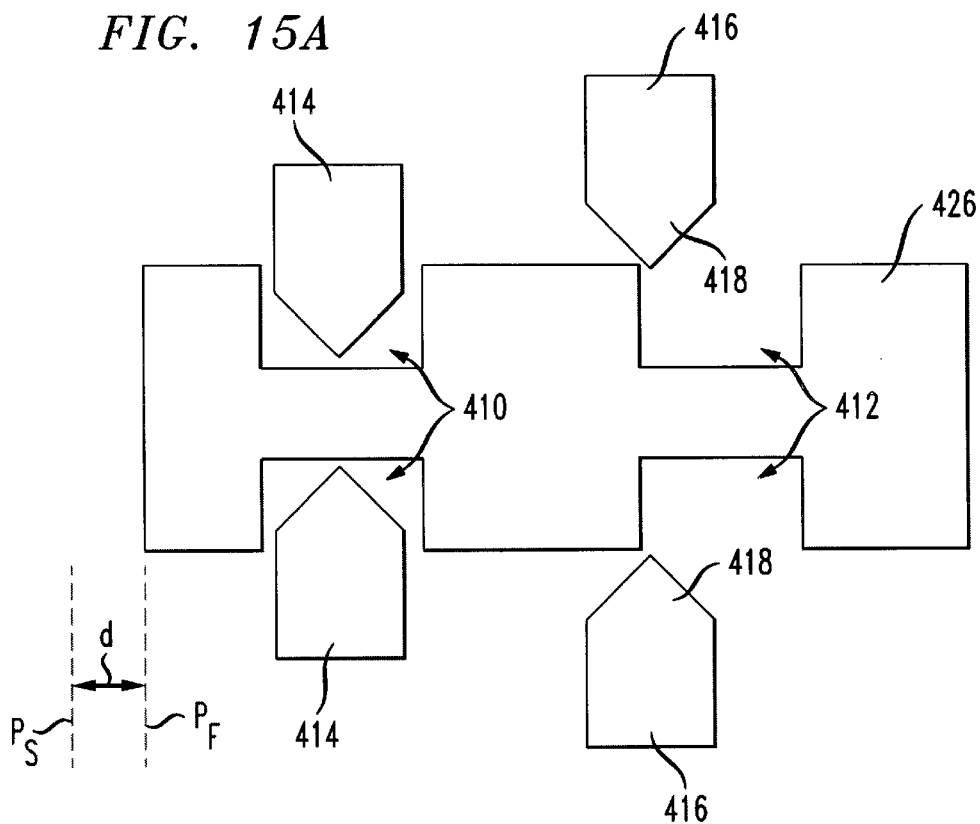
FIGS. 15A and 15B are top views of the channeled translation plate in the first and second positions relative to the driving pins.
Figure 15B:
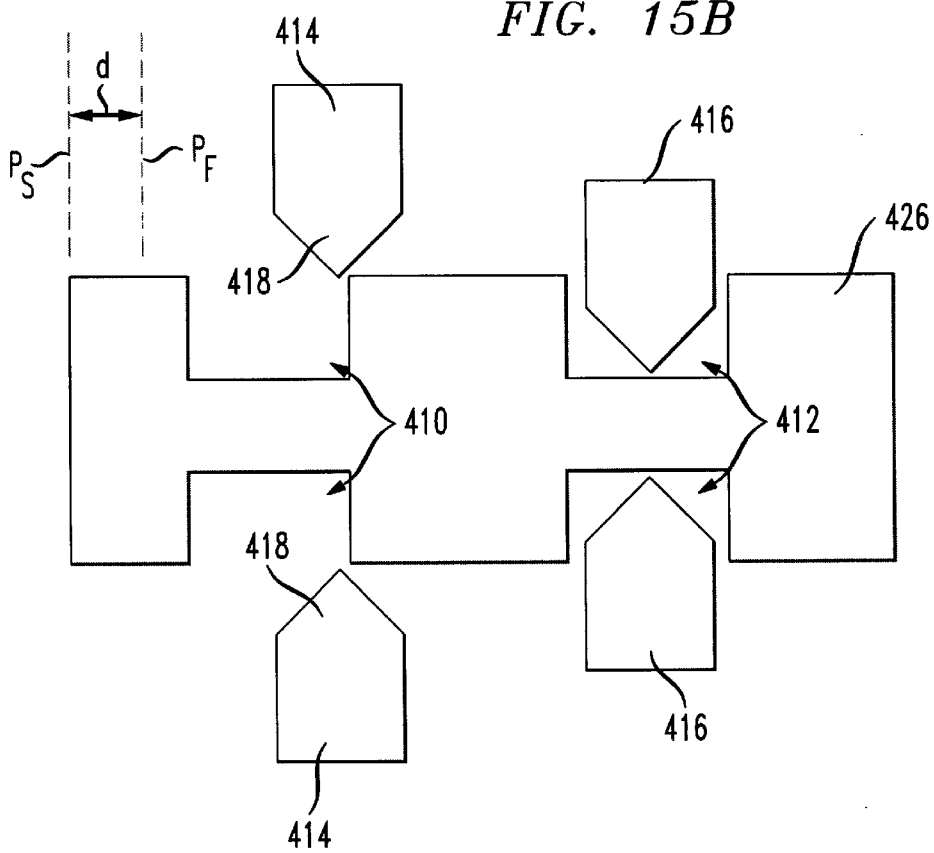

An actuator 408 includes a translation plate 426 that has a pair of first channels 410 and a pair of second channels 412 as shown in FIGS. 14, 15A and 15B. The actuator 408 also includes a first pair of driving pins 414 and a second pair of driving pins 416. The first pair of driving pins 414 are sized for slidable engagement with respective ones of the first channels 410 while the second pair of driving pins 416 are sized for slidable engagement with respective ones of the second channels 412. Each of the driving pins 414 and 416 have a pointed head 418 that contacts the translation plate 426 as the respective pair of pins are inserted into the respective channels by respective ones of scratch drive actuator mechanisms 420. One of ordinary skill in the art would appreciate that comb drive mechanisms could be used in lieu of the scratch drive actuator mechanisms. Because comb drive mechanisms are well known in the industry, no further description is deemed necessary. The first pair of driving pins 414 slidably engage respective ones of the first channels 410 while the second driving pins 416 retract from the respective second channels 412 so that the translation plate 42b moves to the first position $P_F$ thereby moving the reflective panel 106 to the reflective state. While the translation plate 426 is in the first position $P_F$ as shown in FIG. 15A, the second pair of driving pins 416 are positioned offset relative to the second channels 412. To move the reflective panel 106 from the reflective state to the non-reflective state, the second pair of driving pins 416 slidably engage respective ones of the second channels 412 while the first pair of driving pins 414 retract from the respective ones of the first channels 410. Thus, the translation plate 426 moves to the second position $P_S$ as shown in FIG. 15B. When the translation plate 426 is in the second position $P_S$, the first pair of driving pins 414 are positioned offset relative to the respective ones of the first channels. Note that actuator 408 moves between the first position $P_F$ and the second position $P_S$ at the translation distance "d."

Figure 16:
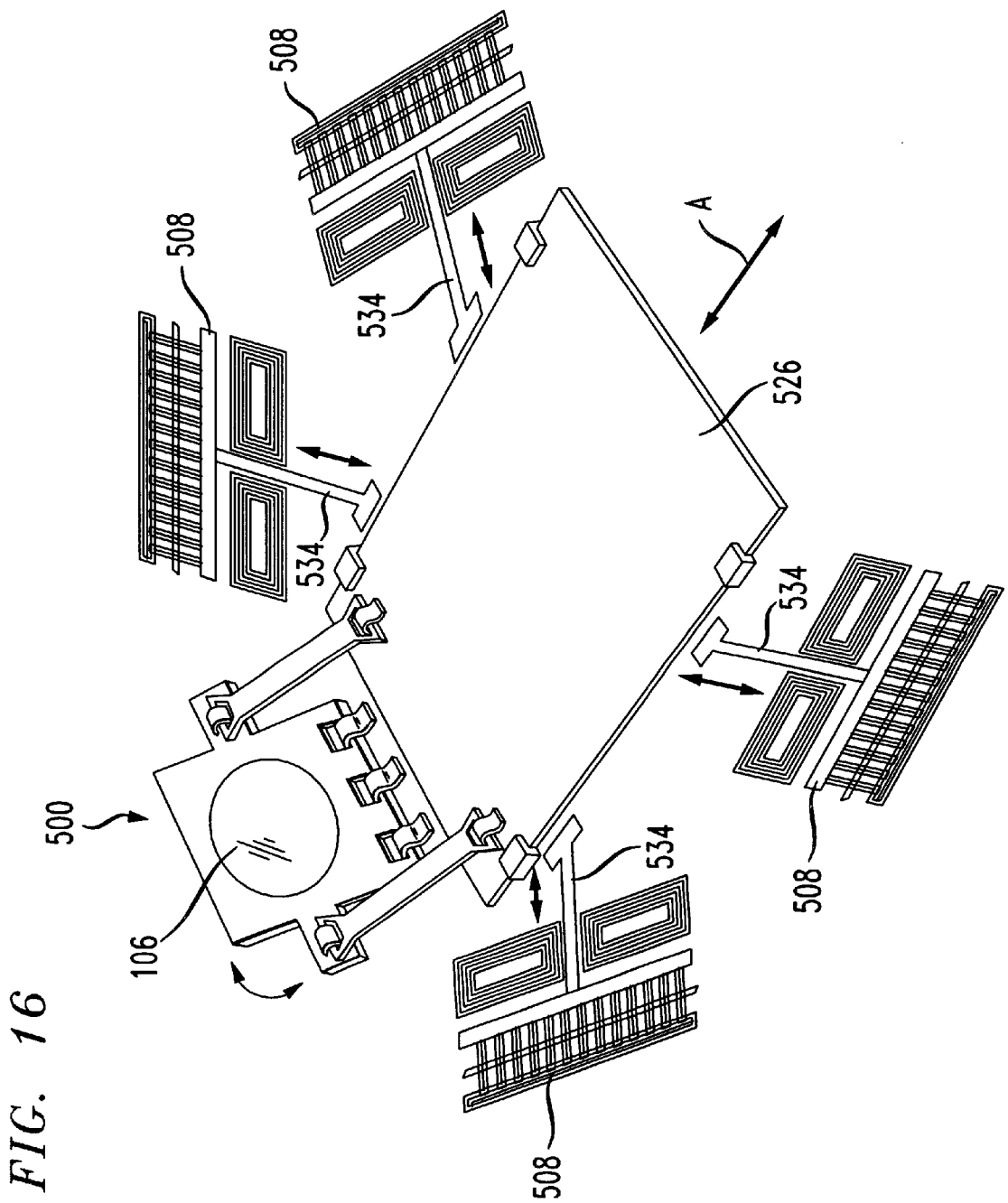
FIG. 16 is a fifth exemplary embodiment of the optical switch device using comb drive mechanisms to move the translation plate to and between the first and second positions.

A fifth exemplary embodiment of an optical switch device 500 is illustrated in FIG. 16. Again, the fifth exemplary embodiment of the optical switch device 500 of the present invention is similar to the exemplary embodiments discussed above except for the actuator. In the fifth exemplary embodiment of the optical switch device 500 of the present invention, a plurality of comb drive mechanisms 508 are connected to the translation plate 526 by push rods 534. The push rods 534 are disposed obliquely relative to the direction of rectilinear movement shown by arrow A of the translation plate 526. Thus, corresponding pairs of the comb drive mechanisms 508 move the translation plate 526 to and between the first position $P_F$ and the second position $P_S$, thereby moving the reflective panel 106 to and between the reflective state and non-reflective state.

A plurality of the optical switch devices described above can be arranged in a manner to form the free-space optical matrix crossconnect apparatus 102 as shown in FIG. 5.

The free-space optical matrix crossconnect apparatus 102 includes the base member 104, an array of optical switch devices 100 and a plurality of fiber optic cables 140. The array of optical switch devices 100 are operatively connected to the base member 104 and are arranged in a plurality of columns $C_1$–$C_n$ and a plurality of rows $R_1$–$R_n$. As described above, each optical switch device 100 includes a, reflective panel and an actuator. The reflective panel is pivotally connected to the base member and moves in an unbiased manner between the reflective state and the non-reflective state. In the reflective state, the reflective panel is disposed perpendicularly relative to the base member as shown in FIG. 9. In the non-reflective state, the reflective panel is disposed in a facially opposing relationship with the base member also as shown in FIG. 9 and drawn phantomly. As shown in FIG. 5, the reflective panels located in $C_1 R_1$, $C_2 R_2$ and $C_n R_n$ are disposed in the reflective state wherein the light beams traveling in free-space through the optical matrix crossconnect apparatus 102 are redirected to respective ones of the fiber optic cables 140 located in rows $R_1$–$R_n$. The reflective panels that are in the non-reflective state allow the light beams to travel along their respective optical paths in an uninterrupted manner.

Each fiber optic cable 140 is disposed along a periphery 105 of the base member 104 at respective ones of the columns and rows in FIG. 5. Further, each fiber optic cable 140 is capable of emitting and receiving a light beam. By way of example, when the light beam from a light emitting fiber optic cable located at a selected column is transmitted to a selected light receiving fiber optic cable located at a selected row, the optical switch device located at an intersection I formed by the selected column and row is actuated by the actuator to move the reflective panel from the non-reflective state to the reflective state in order to reflect the light beam from the light emitting fiber optic cable to the selected light receiving fiber optic cable. Of course, fiber optic cable is bi-directional in that each fiber optic cable can both emit and receive light. Therefore, in the example above, "row" can be substituted for "column" and vice versa without departing from the spirit of the invention.

The free-space optical matrix crossconnect apparatus 102 also includes a plurality of collimator elements 142. Each collimator element 142 is positioned adjacent to respective ones of each fiber optic cable 140 and between each fiber optic cable 140 and the optical switch devices 100. Although not by way of limitation, the plurality of collimator elements 142 and the plurality of fiber optic cables 140 are connected to the base member 104.

It is appreciated that for proper operation of the free-space optical matrix crossconnect apparatus 102, when the optical switch device located at the intersection is in the reflective state, remaining ones of the optical switch devices located in the selected column and row are in the non-reflective state. Also, a skilled artisan would comprehend that a plurality of light beams emitted from a plurality of light emitting fiber optic cables located either at the columns or rows can be transmitted to a plurality of selected light receiving fiber optic cables located at selected remaining ones of the columns and rows through a plurality of optical switch devices located at respective intersections with the reflective panels being in the reflective states. Although not by way of limitation, the plurality of rows are oriented parallel to each other while the plurality of columns are also oriented parallel to each other. As a result, the plurality of rows and columns are oriented perpendicularly relative to each other.

Figure 17:
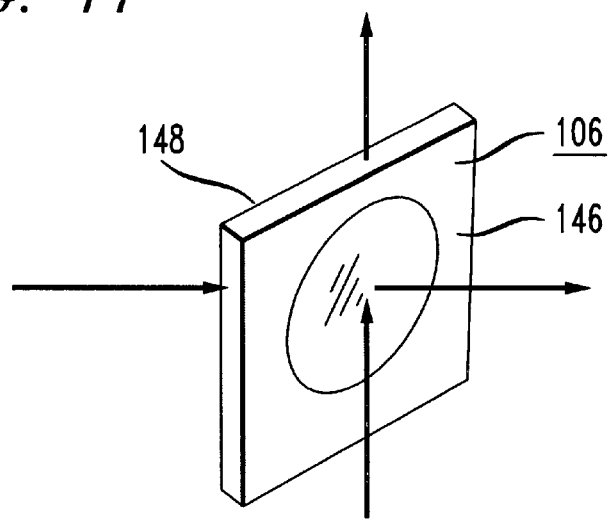
FIG. 17 is a perspective view of the reflective panel using a first surface to reflect one light bean and a second surface to reflect another light beam.
Figure 18:
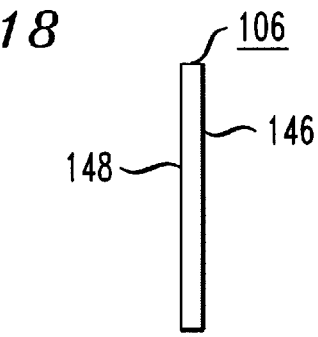
FIG. 18 is a side view of the reflective panel in FIG. 17 illustrating the first and second reflective surfaces.

All of the exemplary embodiments of the optical switch devices described above as well as the free-space optical matrix crossconnect apparatus described above use a reflective panel having only a first surface being reflective. However, one of ordinary skill in the art would appreciate that the reflective panel may have two reflective surfaces or is fabricated from a material being partially reflective and partially transparent. In the FIGS. 17 and 18, the reflective panel 106 includes a first surface 146 and a second surface 148 which is disposed opposite the first surface. As illustrated in FIG. 17, both the first surface 146 and the second surface 148 are fabricated from a reflective material.

Figure 19:
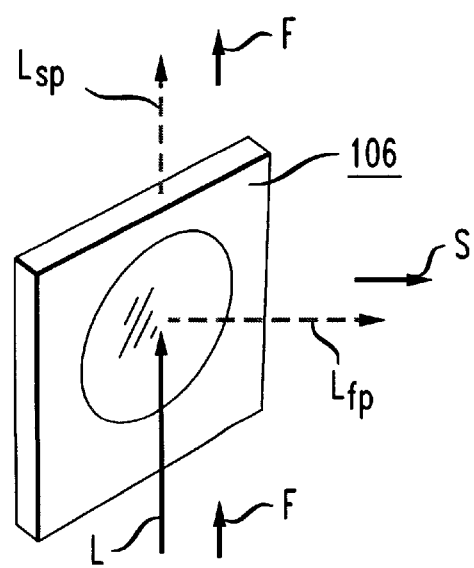
FIG. 19 is a perspective view of a reflective panel fabricated from a semi-transparent, semi-reflective material so that a light beam could be divided into a first light beam portion and a second light bean portion.

In FIG. 19, the reflective panel 106 is fabricated from a material that is partially reflective and partially transparent.

Thus, when the reflective panel 106 is disposed in the reflective state, a light beam L traveling in direction F is divided into a first portion of the light beam $L_{fp}$ which is redirected to the second direction S while a remaining portion of the light beam $L_{rp}$ passes through the reflective panel 106 and continues in the first direction F.

The optical switch device of the present invention as well as the free-space optical matrix crossconnect apparatus provide advantages over the conventional torsion mirror devices. Unlike the torsion mirror devices, power is not required to maintain the reflective panel in either the reflective state or non-reflective state. Also, the scratch drive actuator mechanisms and the comb drive mechanisms can accurately move the reflective panel into the reflective state. Thus, there is no need for a support wall to properly retain the reflective panel in its reflective state. Furthermore, a consideration of mechanical fatigue as a result of electrostatic torque is now eliminated. Additionally, switching the reflective panel from the non-reflective state to the reflective state is approximately four hundred times faster compared with the torsion mirror devices.

Although the present invention has been described in connection with specific exemplary embodiments, it should be appreciated that modifications or changes may be made to the embodiments of the present invention without departing from the inventive concepts contained herein.

What is claimed is:

1. An optical switch device for redirecting at least a portion of a beam of light traveling in free space along a first direction to a second direction different from the first direction, comprising:

a base member;

a reflective panel pivotally connected to the base member and unbiasedly movable between a reflective state wherein the reflective panel is disposed to redirect the beam of light from the first direction to the second direction and a non-reflective state wherein the reflective panel is disposed to permit the beam of light to travel along the first direction, wherein the reflective panel includes at least one hinge pin member and at least one hinge pin connecting member disposed apart from one another and connected to an edge portion of the reflective panel, the at least one hinge pin connecting member projecting outwardly from the edge portion of the reflective panel for mounting the at least one hinge pin member between the at least one hinge pin connecting member; and an actuator connected to the base member and the reflective panel and operative to cause the reflective panel to move to and between the reflective state and the non-reflective state.

2. An optical switch device according to claim 1, wherein the reflective panel includes a first surface and a second surface disposed opposite the first surface, the first surface being reflective.

3. An optical switch device according to claim 2, wherein the second surface is reflective.

4. An optical switch device according to claim 1, wherein the reflective panel is fabricated from a material being partially reflective and partially transparent whereby, when the reflective panel is disposed in the reflective state, a portion of the beam of light is redirected to the second direction while a remaining portion of the beam of light continues in the first direction.

5. An optical switch device according to claim 1, further comprising a staple element having a channel sized to receive the at least one hinge pin member, the staple element connected to the base member with the at least one hinge pin member disposed within the channel to provide pivotal movement of the reflective panel about a pivot axis extending through the at least one hinge pin member.

6. An optical switch device according to claim 1, wherein the staple element and the at least one hinge pin member are disposed in close proximity to each another in a manner to permit the reflective panel to freely pivot about the pivot axis without interference from the staple element.

7. An optical switch device according to claim 1, wherein the actuator includes a hinge assembly and a translation plate, the hinge assembly having at least one connecting rod with a first end of the connecting rod pivotally connected to the reflective panel and an opposite second end pivotally connected to the translation plate, the translation plate slidably connected to the base member and movable between a first position wherein the reflective panel is in the reflective state and a second position wherein the reflective panel in the non-reflective state.

8. An optical switch device according to claim 7, wherein the actuator includes one of a scratch drive actuator mechanism and a comb drive mechanism, a respective one of the scratch drive actuator mechanism and the comb drive mechanism being connected to the translation plate and operative in conjunction with the base member to cause the translation plate to move to at least the first position.

9. An optical switch device according to claim 8, wherein the respective one of the scratch drive actuator mechanism and the comb drive mechanism causes the translation plate to move to the second position.

10. An optical switch device according to claim 8, wherein the actuator includes a spring element connected to and between the base member and the translation plate and operative to cause the translation plate to move from the first position to the second position.

11. An optical switch device according to claim 7, wherein the translation plate includes at least a first channel and a second channel and wherein the actuator includes a first driving pin and a second driving pin, the first driving pin sized for slidable engagement with the first channel and the second driving pin sized for slidable engagement with the second channel whereby the first driving pin slidably engages the first channel while the second driving pin retracts from the second channel so that the translation plate moves to the first position with the second driving pin being positioned offset relative to the second channel and the second driving pin slidably engages the second channel while the first driving pin retracts from the first channel so that the translation plate moves to the second position with the first driving pin being positioned offset relative to the first channel.

12. An optical switch device for reflecting at least one beam of light, comprising:
a base member;
reflective means connected to the base member and unbiasedly movable between a reflective state for reflecting the at least one beam of light and a non-reflective state wherein the reflective means includes a reflective panel fabricated from a material being partially reflective and partially transparent whereby, when the reflective panel is disposed in the reflective state a portion of the at least one beam of light is redirected to the second direction while a remaining portion of the at least one beam of light continues in the first direction; and
actuator means operative with the base member and the reflective means for causing the reflective means to move to and between the reflective state and the non-reflective state.

13. An optical switch device according to claim 12, wherein the reflective means includes a reflective panel having a first surface and a second surface disposed opposite the first surface, the first surface being reflective.

14. An optical switch device according to claim 13, wherein the second surface is reflective so that a second beam of light can be reflected while the first surface reflects the at least one beam of light.

15. An optical switch device according to claim 13, wherein the actuator means includes one of a scratch drive actuator mechanism and a comb drive mechanism.

16. A free-space optical matrix crossconnect apparatus, comprising:
a base member;
an array of reflective elements operatively connected to the base member and arranged in a plurality of columns and rows, each reflective element including a reflective panel and an actuator, the reflective panel being pivotally connected to the base member and unbiasedly movable between a reflective state wherein the reflective panel is disposed perpendicularly relative to the base member and a non-reflective state wherein the reflective panel is disposed in a facially opposing relationship on the base member;
a plurality of fiber optic ports, each fiber optic port disposed along a periphery of the base member at a respective one of the columns and rows and capable of emitting and receiving a light beam so that when the light beam from a light emitting fiber optic port located at a selected one of the columns and rows is transmitted to a selected light receiving fiber optic port located at a selected remaining one of the rows and columns, the optical switch device located at an intersection formed by the selected column and row is actuated by the actuator to move the reflective panel from the non-reflective state to the reflective state to reflect the light beam from the light emitting fiber optic port to the selected light receiving fiber optic port.

17. A free-space optical matrix crossconnect apparatus according to claim 16, further comprising a plurality of collimator elements, each collimator element being disposed adjacent to respective ones of each fiber optic port and between each fiber optic port and the reflective elements.

18. A free-space optical matrix crossconnect apparatus according to claim 17, wherein the plurality of collimator elements and the plurality of fiber optic ports are connected to the base member.

19. A free-space optical matrix crossconnect apparatus according to claim 16, wherein when the reflective element located at the intersection formed by the selected column and row is in the reflective state, remaining ones of the reflective elements located in the selected column and row are in the non-reflective state.

20. A free-space optical matrix crossconnect apparatus according to claim 19, wherein a plurality of light beams from a plurality of light emitting fiber optic ports located at selected ones of the columns and rows are transmitted to a plurality of selected light receiving fiber optic ports located at selected remaining ones of the rows and columns through a plurality of reflective elements located at respective intersections formed by the selected columns and rows in respective reflective states.

21. A free-space optical matrix crossconnect apparatus according to claim 16, wherein the plurality of rows are oriented parallel to each other, the plurality of columns are oriented parallel to each other and the plurality of rows and columns are oriented perpendicularly relative to each other.

* * * * *